United States Patent
Jagdale et al.

(10) Patent No.: US 8,360,167 B2
(45) Date of Patent: Jan. 29, 2013

(54) COMPOSITE SEAL FOR A HYDRAULIC HAMMER

(75) Inventors: Rakesh Dushyantrao Jagdale, Waco, TX (US); Lauritz Phillip Pillers, II, McGregor, TX (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 12/854,661

(22) Filed: Aug. 11, 2010

(65) Prior Publication Data

US 2012/0037389 A1 Feb. 16, 2012

(51) Int. Cl.
*E21B 12/04* (2006.01)
(52) U.S. Cl. .............................. 173/90; 173/91; 277/569
(58) Field of Classification Search .................. 173/90, 173/91, 212, 135, 206; 277/152, 165, 559, 277/549, 438, 439, 569
See application file for complete search history.

(56) References Cited

U.S. PATENT DOCUMENTS

| | | | |
|---|---|---|---|
| 4,195,854 A | 4/1980 | Bertin | |
| 4,635,945 A * | 1/1987 | Beck | 277/530 |
| 4,664,394 A | 5/1987 | Theissig et al. | |
| 4,991,669 A * | 2/1991 | Andersson | 175/135 |
| 5,137,096 A | 8/1992 | Druesdow | |
| 5,288,086 A * | 2/1994 | Kiesel | 277/554 |
| 5,873,579 A * | 2/1999 | Prokop et al. | 279/19 |
| 5,944,120 A | 8/1999 | Barden | |
| 6,119,795 A | 9/2000 | Lee | |
| 6,227,307 B1 | 5/2001 | Lee | |
| 6,457,723 B1 | 10/2002 | Yamada et al. | |
| 6,510,904 B1 | 1/2003 | Tyrrell | |
| 6,578,644 B2 | 6/2003 | Frenzel et al. | |
| 6,626,438 B2 * | 9/2003 | Walden | 277/510 |
| 6,648,079 B2 * | 11/2003 | Deimel et al. | 173/91 |
| 6,702,294 B2 | 3/2004 | Sassi | |
| 7,152,692 B2 | 12/2006 | Hurskainen et al. | |
| 7,438,139 B2 | 10/2008 | Pillers, II | |
| 7,467,798 B2 | 12/2008 | Morimoto et al. | |
| 7,604,243 B2 * | 10/2009 | Zitting et al. | 277/584 |
| 2002/0079650 A1 * | 6/2002 | Hosoda | 277/549 |
| 2003/0000715 A1 | 1/2003 | Ullrich et al. | |
| 2005/0167131 A1 | 8/2005 | Hurskainen et al. | |
| 2006/0012129 A1 | 1/2006 | Oldenburg | |
| 2006/0283615 A1 | 12/2006 | Pillers, II et al. | |
| 2009/0198382 A1 | 8/2009 | Koch et al. | |
| 2009/0229844 A1 | 9/2009 | Pillers, II | |
| 2010/0193212 A1 | 8/2010 | Konecnik | |

\* cited by examiner

*Primary Examiner* — Sameh H. Tawfik
*Assistant Examiner* — Nathaniel Chukwurah
(74) *Attorney, Agent, or Firm* — Miller, Matthias & Hull

(57) ABSTRACT

A hydraulic hammer (14) may include a housing (30) having a distal end defining an opening (38), a bushing (54) positioned adjacent the housing distal end, the bushing (54) having an inner guide surface (58) and a distal end (56), and a tool (22) having a proximal section (60) slidably disposed in the bushing inner guide surface (58) and a distal section (62) projecting from the housing (30) through the opening (38). The hydraulic hammer (14) may further include a composite seal (70) having an exterior cover (72) with a proximal end (76) releasably coupled to the bushing (54) and a distal end (77) projecting from the distal end (56) of the bushing (54), the exterior cover distal end (77) defining a recess (90) opening toward the tool (22), and an interior seal (74) having a base (92) disposed in the exterior cover recess (90) and a sealing arm (94) projecting inwardly from the base (92), the sealing arm (94) being configured to sealingly engage the tool (22).

22 Claims, 5 Drawing Sheets

COMPOSITE SEAL FOR A HYDRAULIC HAMMER

TECHNICAL FIELD

This disclosure relates generally to hydraulic hammers, and more specifically to seals used to prevent dust and debris from migrating into hydraulic hammers.

BACKGROUND

Hydraulic hammers are generally known to include a tool extending partially out of a housing. Such hammers may include a hydraulically actuated power cell having an impact system operatively coupled to the tool. The impact system generates repeated, longitudinally directed forces against a proximal end of the tool disposed inside the housing. The distal end of the tool, extending outside of the housing, may be positioned against rock, stone, or other materials, thereby to break up those materials. During operation, the hydraulic hammer will form large pieces of broken material as well as stone dust and fine grit. The stone dust may include abrasive material, such as quartz, which could increase wear and cause premature failure of components should it migrate along the tool and into the interior of the hydraulic hammer.

Various seal arrangements have been proposed to address the issue of migrating dust. In many of these devices, the seal is positioned centrally within the housing, near the internal components of the power cell. Locating the seal in this manner, however, makes it difficult and overly time-consuming to repair and/or replace, as the housing and internal components must be at least partially disassembled to access the seal. The seal is a consumable wear component, and therefore the down time and resources needed to maintain a centrally located seal can be significant.

While locating the seal closer to the distal end of the housing may improve access and facilitate replacement, such a seal location increases the likelihood that the seal will be impacted by debris during operation. To improve sealing engagement between the seal and the tool, the seal is typically formed of a relatively soft, flexible material. Impacts from debris may tear, rip, or otherwise damage the seal so that it no longer adequately prevents migration of dust along the tool.

U.S. Pat. No. 5,873,579 to Prokop discloses a hydraulic hammer having a seal located near the distal end of the housing and a separate, distally positioned transverse slide member for limiting direct access to the seal. The slide member is retained in a chamber sized to permit the slide member to move transversely with respect to the tool axis, thereby to accommodate swivel motion of the tool during operation. The slide member and its retaining structure, however, must be removed in order to repair and/or replace the seal, thereby increasing the complexity and cost of maintaining the device. In an alternative embodiment, Prokop discloses a sealing ring disposed on an inner wall of the slide member to provide additional sealing. The sealing ring, however, is directly exposed to the debris generated during operation, and the slide member and retaining structure must still be removed to access the primary inner seal.

SUMMARY OF THE DISCLOSURE

According to certain aspects of this disclosure, a hydraulic hammer may include a housing having a distal end defining an opening, a bushing positioned adjacent the housing distal end, the bushing having an inner guide surface and a distal end, and a tool having a proximal section slidably disposed in the bushing inner guide surface and a distal section projecting from the housing through the opening. A hydraulic hammer may further include a composite seal having an exterior cover with a proximal end releasably coupled to the bushing and a distal end projecting from the distal end of the bushing, the exterior cover distal end defining a recess opening toward the tool, and an interior seal having a base disposed in the exterior cover recess and a sealing arm projecting inwardly from the base, the sealing arm being configured to sealingly engage the tool.

In another aspect of the disclosure, a composite seal is provided for a hydraulic hammer having a bushing with an inner guide surface and a distal end, and a tool having a proximal section slidably disposed in the bushing inner guide surface and a distal section projecting distally from the bushing. The composite seal may include an exterior cover having a proximal end configured for releasable coupling to the bushing and a distal end sized to project from the distal end of the bushing, the exterior cover distal end defining a recess opening toward the tool. An interior seal may have a base disposed in the exterior cover recess and a sealing arm projecting inwardly from the base, the sealing arm being configured to sealingly engage the tool.

In a further aspect of the disclosure, a bushing assembly is provided for a hydraulic hammer including a housing having a distal end defining an opening and a tool having a proximal section and a distal section projecting from the housing through the opening. The bushing assembly may include a bushing positioned adjacent the housing distal end, the bushing having an inner guide surface sized to slidably receive the tool proximal section, the bushing further including a distal end. A composite seal includes an exterior cover having a proximal end releasably coupled to the bushing and a distal end projecting from the distal end of the bushing, the exterior cover distal end defining a recess opening toward the tool. An interior seal may have a base disposed in the exterior cover recess and a sealing arm projecting inwardly from the base, the sealing arm being configured to sealingly engage the tool.

In another aspect of the disclosure that may be combined with any of these aspects, the exterior cover is constructed of a relatively rigid material and the interior seal is constructed of a relatively flexible material.

In another aspect of the disclosure that may be combined with any of these aspects, the relatively rigid material is mineral filled nylon and the relatively flexible material is polyurethane.

In another aspect of the disclosure that may be combined with any of these aspects, the bushing includes an outer surface having an exterior channel, and the exterior cover proximal end includes an arm and a bead projecting inwardly from the arm and sized for insertion into the exterior channel.

In another aspect of the disclosure that may be combined with any of these aspects, the exterior cover further includes a neck disposed between the exterior cover proximal end and the exterior cover distal end, and the neck and the bushing outer surface are configured to form a relief gap therebetween.

In another aspect of the disclosure that may be combined with any of these aspects, the distal end of the exterior cover overlies at least a portion of an exterior surface of the sealing arm.

In another aspect of the disclosure that may be combined with any of these aspects, the distal end of the exterior cover defines an outer surface and includes a foot projecting inwardly from the outer surface.

DETAILED DESCRIPTION

Figure 1:
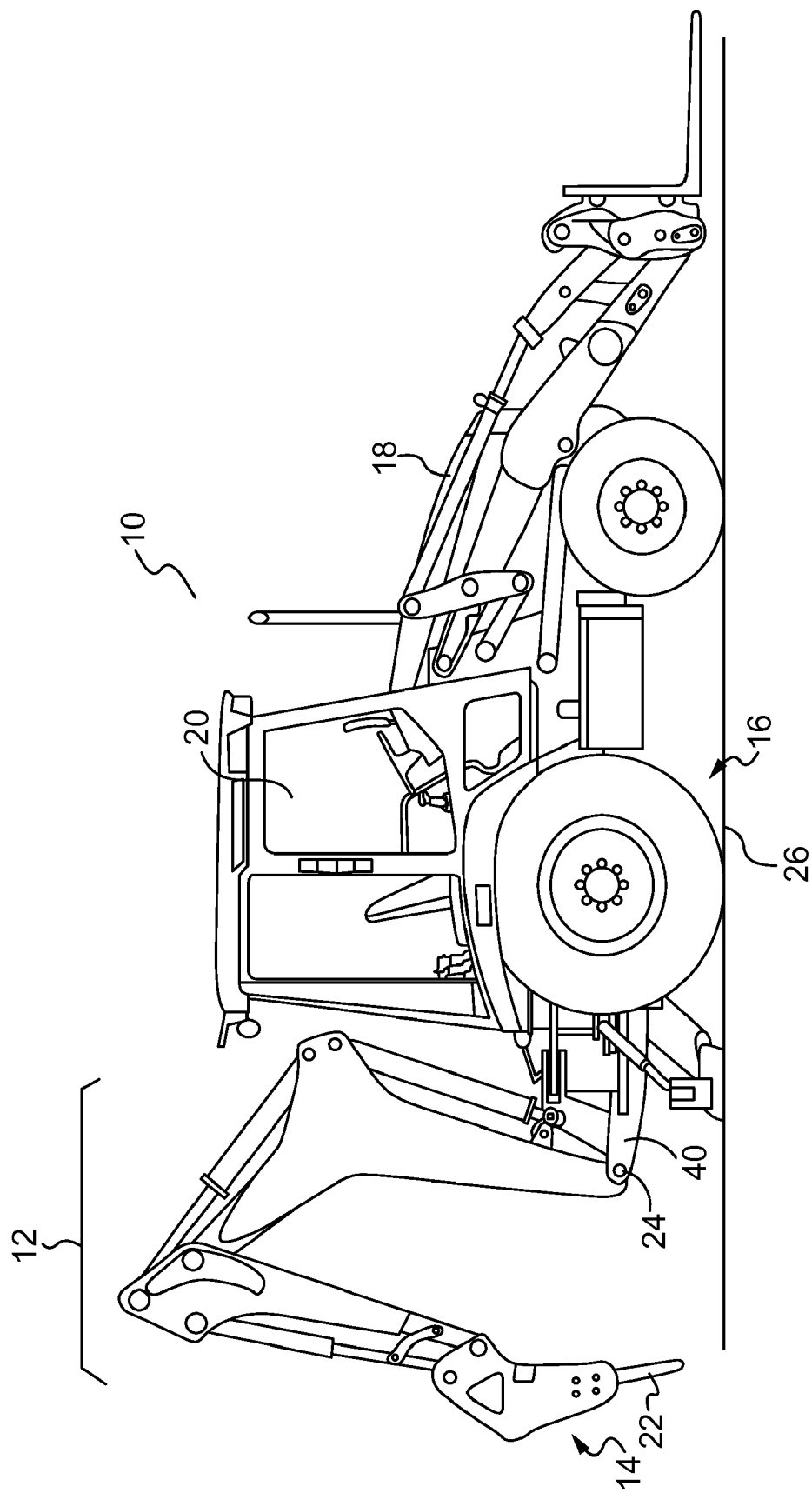
FIG. 1 is a diagrammatic illustration of a machine having a hydraulic hammer.

FIG. 1 illustrates an exemplary machine 10 including a hydraulic hammer 14. Machine 10 may embody a fixed or mobile machine that performs some type of operation associated with an industry such as mining, construction, farming, transportation, or any other industry known in the art. For example, machine 10 may be an earth moving machine such as a backhoe, an excavator, a dozer, a loader, a motor grader, or any other earth moving machine. Machine 10 may include an implement system 12 configured to move the hydraulic hammer 14, a drive system 16 for propelling machine 10, a power source 18 that provides power to implement system 12 and drive system 16, and an operator station 20 for operator control of implement system 12 and drive system 16.

Power source 18 may embody an engine such as, for example, a diesel engine, a gasoline engine, a gaseous fuel-powered engine or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving implement system 12.

Implement system 12 may include a linkage structure acted on by fluid actuators to move the hydraulic hammer 14. The linkage structure of implement system 12 may be complex, for example, including three or more degrees of freedom. The implement system 12 may carry the hydraulic hammer 14 which has a tool 22 for impacting an object or ground surface 26.

Figure 2:
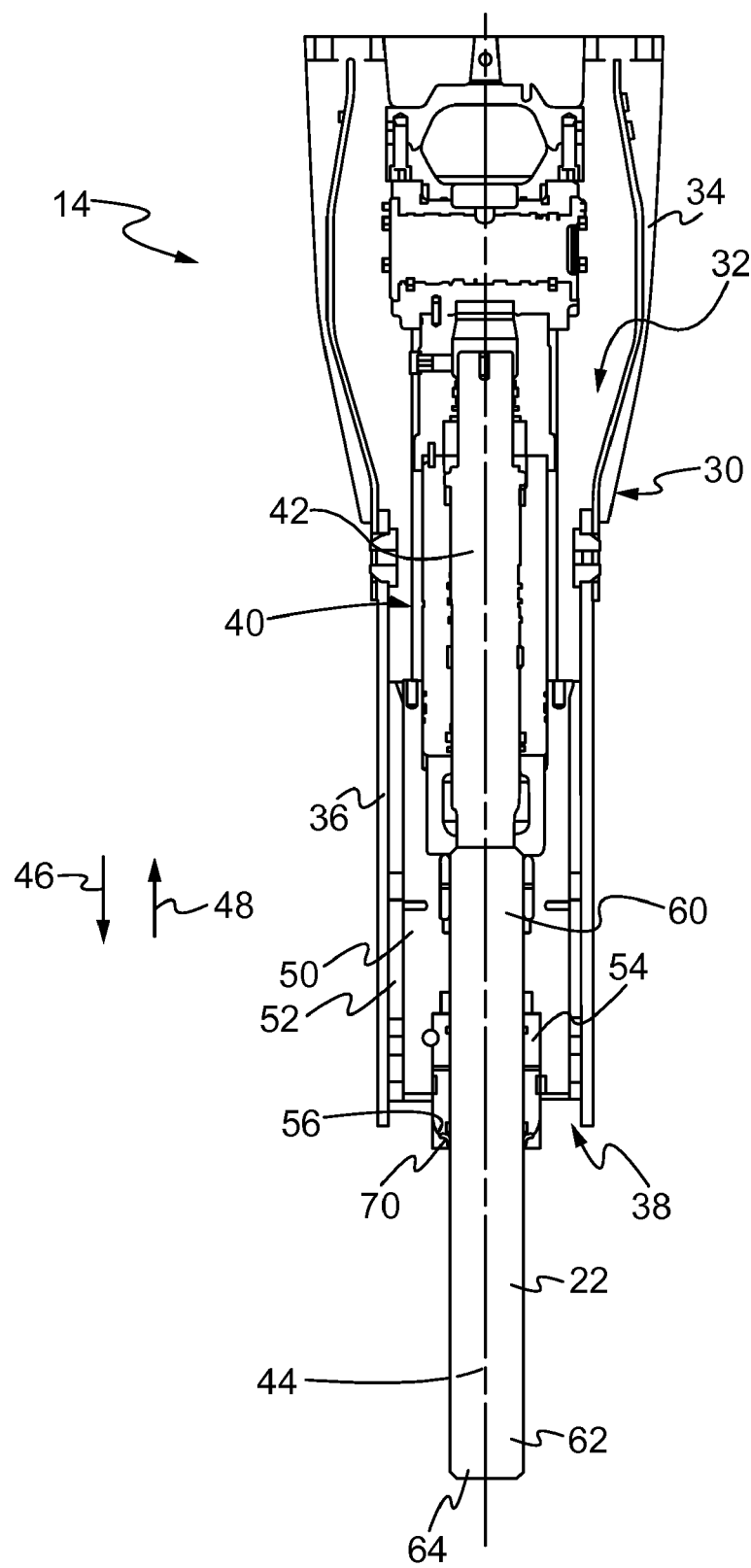
FIG. 2 is a side elevation view, in cross-section, of a hydraulic hammer including a composite seal.

FIG. 2 shows a cross-sectional view of the hydraulic hammer 14 of FIG. 1. The hydraulic hammer 14 includes a housing 30 defining a chamber 32. The housing 30 may include an upper housing member 34 and a lower housing member 36 that are welded or otherwise joined together. The upper and lower housing members 34, 36 define upper and lower chambers, respectively, and together make up the chamber 32. A distal end of the housing 30 (i.e., the lower housing member 36) defines an opening 38.

A power cell 40 is disposed inside the housing chamber 32 and includes several internal components of the hydraulic hammer 14. As shown in FIG. 2, a proximal portion of the power cell 40 provides an impact assembly that includes a piston 42. The piston 42 is operatively housed in the chamber 32 such that the piston 42 can translate along a longitudinal axis 44 in the general direction of arrows 46 and 48. In particular, during a work stroke, the piston 42 moves in the general direction of arrow 46, while during a return stroke the piston 42 moves in the general direction of arrow 48.

Figure 3:
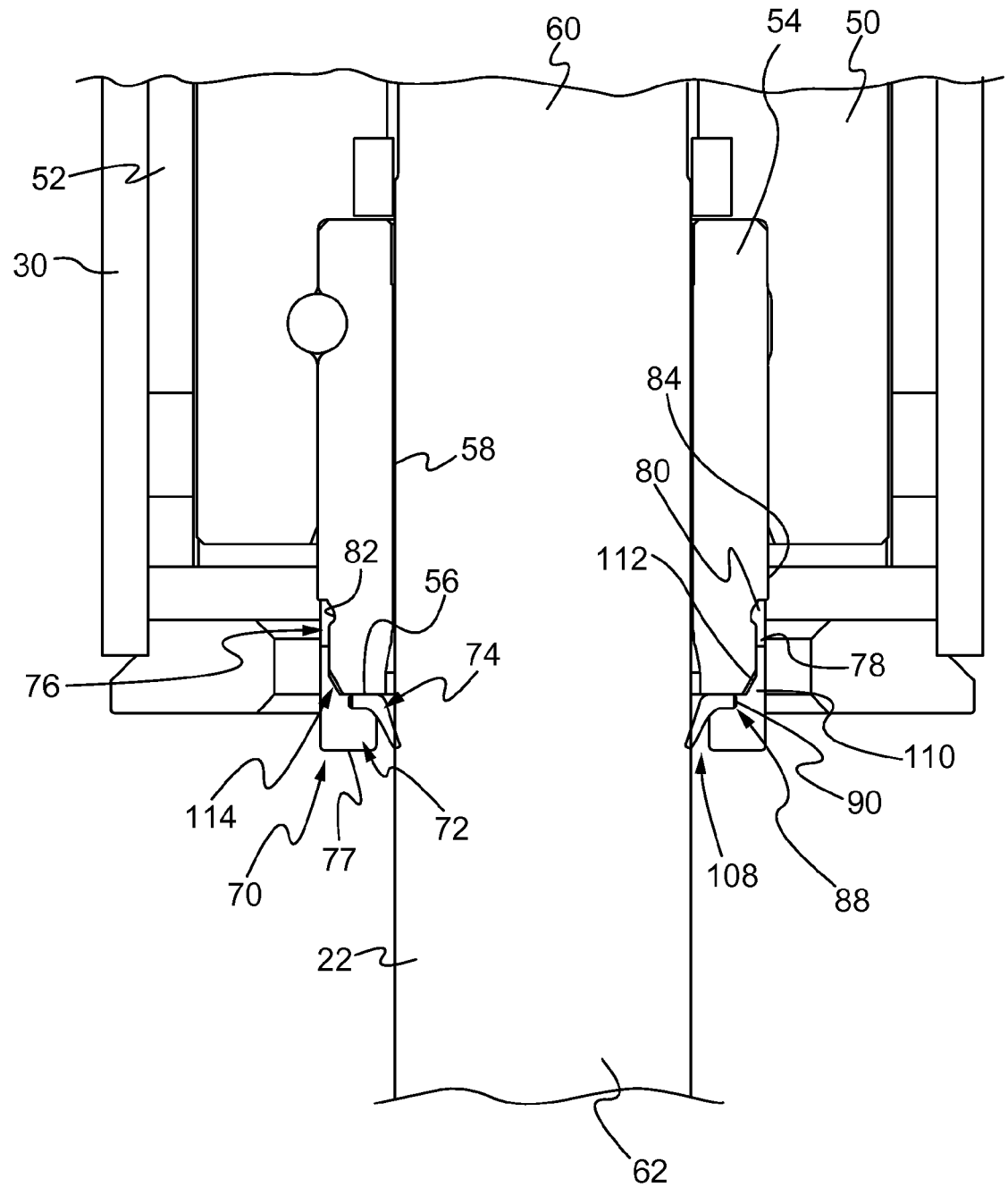
FIG. 3 is an enlarged side elevation view, in cross-section, of a distal end of the hydraulic hammer of FIG. 2.

A distal portion of the power cell 40 includes the work tool 22 and structure for guiding the work tool 22 during operation, as best shown in FIG. 3. Accordingly, the power cell 40 includes a front head 50 inserted into the lower housing member 36 with wear plates 52 interposed between the front head 50 and the housing 30. A lower bushing 54 is inserted into a distal end of the front head 50 so that a distal end 56 of the lower bushing 54 is positioned adjacent the distal end of the housing 30. The bushing further defines an inner guide surface 58. The work tool 22 includes a proximal section 60 sized to be slidably received within the inner guide surface 58 of the lower bushing 54. The work tool 22 further has a distal section 62 which projects from the lower bushing 54 and housing 30 through the opening 38.

A hydraulic circuit (not shown) provides pressurized fluid to drive the piston 42 toward the work tool 22 during the work stroke and to return the piston 42 during the return stroke. The hydraulic circuit is not described further, since it will be apparent to one skilled in the art that any suitable hydraulic system may be used to provide pressurized fluid to the piston 42, such as the arrangement described in U.S. Pat. No. 5,944,120.

In operation, near the end of the work stroke, the piston 42 strikes the proximal section 60 of the work tool 22. The distal section of the work tool 22 may include a tip 64 positioned to engage an object or ground surface 26. The impact of the piston 42 on the proximal section 60 drives the tip 64 into the object or ground surface 26, thereby creating pieces of broken material as well as dust, grit, and other debris.

Figure 4:
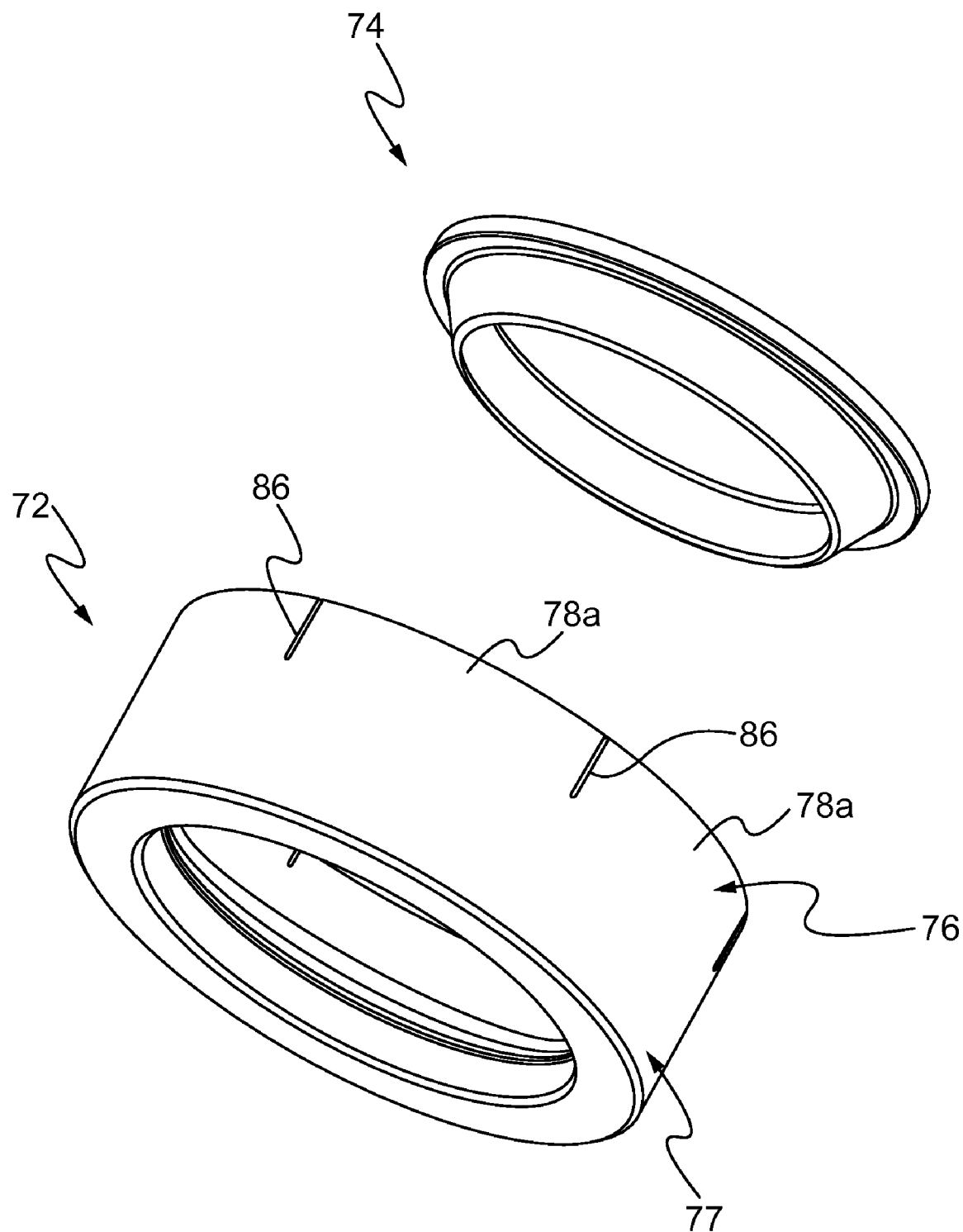
FIG. 4 is an exploded perspective view of the composite seal.
Figure 5:
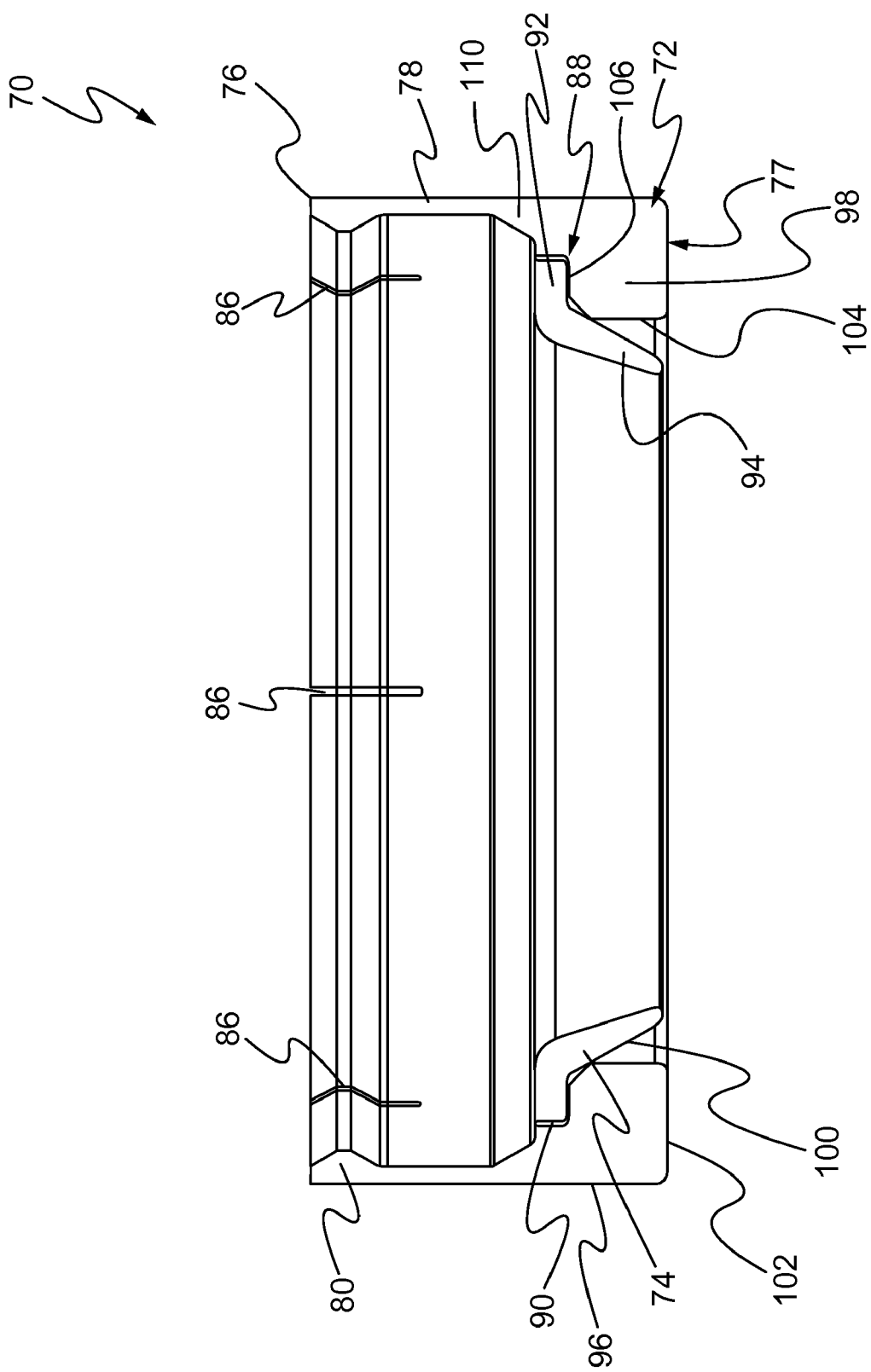
FIG. 5 is a side elevation view, in cross-section, of the composite seal of FIG. 4 as assembled.

The hydraulic hammer 14 further includes a composite seal 70 for preventing migration of dust and other broken material from migrating along the work tool 22 and into the interior components of the power cell 40, as best shown in FIGS. 3-5. The composite seal 70 generally includes an exterior cover 72 and an interior seal 74.

The exterior cover 72 includes a proximal end 76 that may be releasably coupled to the lower bushing 54. In the illustrated embodiment, the proximal end 76 of the exterior cover 72 includes an arm 78 and a bead 80 projecting inwardly from the arm 78. The bead 80 is sized for insertion into an exterior channel 82 formed in an outer surface 84 of the lower bushing 54. The proximal end 76 of the exterior cover 72 may include a plurality of slots 86 to form arm segments 78a that may be deflected more easily in the radial direction, thereby to facilitate the exterior cover 72 to be attached to or removed from the lower bushing 54.

While the bead-in-channel embodiment described immediately above provides one manner in which to releasably attach the exterior cover 72 to the lower bushing 54, other releasably attachable means may also be used. For example, a reverse arrangement may be provided in which the arm 78 of the exterior cover 72 is formed with a channel and the lower bushing 54 is formed with an outwardly projecting bead sized to fit within the channel. Still further, the exterior cover 72 and lower bushing 54 may be formed with complementary threads, interlocking tabs, releasable fasteners, or other known arrangements for releasably attaching two components.

The exterior cover 72 may further include a shoulder 88. As best shown in FIG. 3, the shoulder 88 abuts a distal end of the lower bushing 54 to define an annular recess 90 oriented to open toward the work tool 22.

The interior seal 74 may be attached to the exterior cover 72 to form the composite seal 70. As best shown in FIG. 5, the interior seal 74 includes a base 92 disposed in the recess 90 of the exterior cover 72. When the composite seal 70 is assembled on the lower bushing 54, the base 92 is retained between the shoulder 88 of the exterior cover and the distal end of the lower bushing 54. The interior seal 74 further includes a sealing arm 94 which projects inwardly from the base 92 and is configured to sealingly engage the work tool 22. In the illustrated embodiment, the interior seal 74 has a frustoconical shape that extends inwardly and distally with respect to the base 92.

The interior seal 74 may be releasably coupled to the exterior cover 72 so that the composite seal 70 forms a sub-assembly that can be attached to or removed from the lower bushing 54 as a unit. In the illustrated embodiment, the sealing arm 94 of the interior seal 74 frictionally engages the exterior cover 72. Alternatively, the interior seal 74 and exterior cover 72 may be mechanically coupled, such as by interlocking tabs, complementary detents, or other means, to positively secure the interior seal 74 to the exterior cover 72.

A distal end 77 of the exterior cover 72 may be configured to overlie and protect the interior seal 74 from debris. As best shown in FIG. 5, the distal end 77 of the exterior cover 72 includes an outer surface 96 with a foot 98 projecting inwardly therefrom. The foot 98 overlies at least a portion of an exterior surface 100 of the interior seal 74. More specifically, the foot 98 includes a distal wall 102, an inner wall 104, and a shoulder wall 106 which, with the exterior surface 100, defines a structure that extends at least partially over the interior seal 74. Additionally, as best understood with reference to FIG. 3, the foot 98 reduces the size of a gap 108 between the exterior cover 72 and the work tool 22, thereby preventing larger sized pieces of broken material from reaching the interior seal 74. The exterior cover 72 may be formed of a relatively rigid material, such as mineral filled nylon, to better resist impacts from debris. The interior seal 74 may be formed of a relatively flexible material, such as polyurethane, to promote sealing engagement with the work tool 22.

The exterior cover 72 may further be configured to accommodate transverse movement of the work tool 22 during operation. Forces may be applied to the work tool 22 during operation which tend to bend or flex the work tool 22 in a transverse direction, normal to the longitudinal axis 44. The rigid material of the exterior cover 72 may also be more brittle, and therefore the forces applied on the exterior cover 72 by a transversely flexing work tool 22 may cause premature wear and failure of the exterior cover 72. To accommodate transverse movements of the work tool 22, the exterior cover 72 may include a neck 110 disposed between the proximal and distal ends 76, 77. The neck 110 is shaped to be spaced from the outer surface 84 of the lower bushing 54. In the illustrated embodiment, the outer surface 84 is formed with a chamfer 112, and a relief gap 114 exists between the chamfer and an inwardly facing surface of the neck 110. The relief gap 114 allows the distal end 77 of the exterior cover 72 to move transversely with respect to the proximal end 76, thereby to reduce wear on the exterior cover 72 when the work tool 22 moves transversely.

INDUSTRIAL APPLICABILITY

The composite seal 70 provides a seal to prevent dust from migrating along the work tool 22 that is less susceptible to damage from debris. The exterior cover 72, being formed of a relatively rigid material, provides a barrier that reduces the amount of debris reaching the interior seal 74, thereby extending the life of the seal 74.

The composite seal 70 also has improved accessibility to promote assembly and replacement. The composite seal 70 is located near the distal end of the housing 30, and therefore may be accessed through the opening 38 without necessitating disassembly of the hydraulic hammer 14. The exterior cover 72 and interior seal 74 may be removed and replaced, either individually or as a sub-assembly.

Additionally, the exterior cover 72 of the composite seal 70 includes a proximal end 76 that is easily attached and removed from the lower bushing 54. More specifically, the exterior cover includes flexible arm segments 78a formed with beads 80 that are configured to engage a channel 82 formed in the lower bushing 54. During assembly, the proximal end 76 of the exterior cover 72 may be inserted over the distal end of the lower bushing 54. As the beads 80 engage the outer surface 84 of the lower bushing 54, the arm segments 78a may deflect outwardly to permit the exterior cover 72 to slide over the lower bushing 54. When the exterior cover 72 is slid a sufficient distance over the lower bushing 54, the beads 80 will seat in the channel 82, thereby holding the exterior cover 72 in place. The arm segments 78a may be configured to generate a "snap-fit" between the exterior cover 72 and the lower bushing 54, which may include an audible or tactile signal indicating that the exterior cover 72 is secured to the lower bushing 54. To remove the exterior cover 72 from the lower bushing 54, a sufficient force may be applied to the exterior cover 72 so that the beads 80 unseat from the channel 82. Additionally or alternatively, one or more arm segments 78a may be pried outwardly to unseat the beads 80 from the channel 82, thereby permitting removal of the exterior cover 72 from the lower bushing 54.

Alternatively, the composite seal 70 assembled or removed by removing the lower bushing 54 from the housing 30, which permits easier access to the composite seal 70. While this approach requires some disassembly of the hydraulic hammer 14, the lower bushing 54 is typically easily accessible from the distal end of the housing 30 and therefore requires minimal work.

Although the disclosed embodiments have been described with reference to a hammer assembly in which the tool is driven by a hydraulically actuated piston, the disclosed embodiments are applicable to any tool assembly having a reciprocating work tool movable within a chamber by suitable drive structure and/or return structure. The disclosed embodiments encompass pneumatic tools and other impact tools.

What is claimed is:

1. A bushing assembly for a hydraulic hammer including a housing having a distal end defining an opening and a tool having a proximal section and a distal section projecting from the housing through the opening, the bushing assembly comprising:
    a bushing positioned adjacent the housing distal end, the bushing having an outer surface, an inner guide surface sized to slidably receive the tool proximal section, and a distal end; and
    a composite seal including:
        an exterior cover having a proximal end releasably coupled to the bushing, a distal end projecting from the distal end of the bushing, and a neck disposed between the exterior cover proximal end and the exterior cover distal end, in which the neck and the bushing outer surface are configured to form a relief gap therebetween; and
        an interior seal having a base disposed in the exterior cover recess and a sealing arm projecting inwardly from the base, the sealing arm being configured to sealingly engage the tool.

2. A hydraulic hammer, comprising:
    a housing having a distal end defining an opening;
    a bushing positioned adjacent the housing distal end, the bushing having an inner guide surface and a distal end;
    a tool having a proximal section slidably disposed in the bushing inner guide surface and a distal section projecting from the housing through the opening; and
    a composite seal including:
        an exterior cover having a proximal end releasably coupled to the bushing and a distal end projecting from the distal end of the bushing, the exterior cover distal end defining a proximally-facing wall spaced from the bushing distal end to define a recess between the proximally-facing wall and the bushing distal end oriented to open toward the tool; and an interior seal having a base disposed in the recess and interposed between the proximally-facing wall and the bushing distal end, and a sealing arm projecting inwardly from the base, the sealing arm being configured to sealingly engage the tool.

3. The hydraulic hammer of claim 2, in which the exterior cover is constructed of a relatively rigid material and the interior seal is constructed of a relatively flexible material.

4. The hydraulic hammer of claim 3, in which the relatively rigid material comprises mineral filled nylon and the relatively flexible material comprises polyurethane.

5. The hydraulic hammer of claim 2, in which the bushing includes an outer surface having an exterior channel, and in which the exterior cover proximal end includes an arm and a bead projecting inwardly from the arm and sized for insertion into the exterior channel.

6. The hydraulic hammer of claim 2, in which the distal end of the exterior cover overlies at least a portion of an exterior surface of the sealing arm.

7. The hydraulic hammer of claim 2, in which the distal end of the exterior cover defines an outer surface and includes a foot projecting inwardly from the outer surface.

8. The hydraulic hammer of claim 2, in which the proximally-facing wall of the exterior cover comprises a shoulder wall provided on a shoulder formed in the exterior cover distal end.

9. A composite seal for a hydraulic hammer including a bushing having an inner guide surface and a distal end and a tool having a proximal section slidably disposed in the bushing inner guide surface and a distal section projecting distally from the bushing, the composite seal comprising:

an exterior cover having a proximal end configured for releasable coupling to the bushing and a distal end sized to project from the distal end of the bushing, the exterior cover distal end defining a proximally-facing wall spaced from the bushing distal end to define a recess between the proximally-facing wall and the bushing distal end oriented to open toward the tool; and an interior seal having a base disposed in the recess and interposed between the proximally-facing wall and the bushing distal end, and a sealing arm projecting inwardly from the base, the sealing arm being configured to sealingly engage the tool.

10. The composite seal of claim 9, in which the exterior cover is constructed of a relatively rigid material and the interior seal is constructed of a relatively flexible material.

11. The composite seal of claim 10, in which the relatively rigid material comprises mineral filled nylon and the relatively flexible material comprises polyurethane.

12. The composite seal of claim 9, in which the bushing includes an outer surface having an exterior channel, and in which the exterior cover proximal end includes an arm and a bead projecting inwardly from the arm and sized for insertion into the exterior channel.

13. The composite seal of claim 9, in which the distal end of the exterior cover overlies at least a portion of an exterior surface of the sealing arm.

14. The composite seal of claim 9, in which the distal end of the exterior cover defines an outer surface and includes a foot projecting inwardly from the outer surface.

15. The composite seal of claim 9, in which the proximally-facing wall of the exterior cover comprises a shoulder wall provided on a shoulder formed in the exterior cover distal end.

16. A bushing assembly for a hydraulic hammer including a housing having a distal end defining an opening and a tool having a proximal section and a distal section projecting from the housing through the opening, the bushing assembly comprising:

a bushing positioned adjacent the housing distal end, the bushing having an inner guide surface sized to slidably receive the tool proximal section, the bushing further including a distal end; and a composite seal including:
an exterior cover having a proximal end releasably coupled to the bushing and a distal end projecting from the distal end of the bushing, the exterior cover distal end defining a proximally-facing wall spaced from the bushing distal end to define a recess between the proximally-facing wall and the bushing distal end oriented to open toward the tool; and an interior seal having a base disposed in the recess and interposed between the proximally-facing wall and the bushing distal end, and a sealing arm projecting inwardly from the base, the sealing arm being configured to sealingly engage the tool.

17. The bushing assembly of claim 16, in which the exterior cover is constructed of a relatively rigid material and the interior seal is constructed of a relatively flexible material.

18. The bushing assembly of claim 17, in which the relatively rigid material comprises mineral filled nylon and the relatively flexible material comprises polyurethane.

19. The bushing assembly of claim 16, in which the bushing includes an outer surface having an exterior channel, and in which the exterior cover proximal end includes an arm and a bead projecting inwardly from the arm and sized for insertion into the exterior channel.

20. The bushing assembly of claim 16, in which the distal end of the exterior cover overlies at least a portion of an exterior surface of the sealing arm.

21. The bushing assembly of claim 16, in which the distal end of the exterior cover defines an outer surface and includes a foot projecting inwardly from the outer surface.

22. The bushing assembly of claim 16, in which the proximally-facing wall of the exterior cover comprises a shoulder wall provided on a shoulder formed in the exterior cover distal end.

* * * * *